United States Patent [19]

Schneider et al.

[11] Patent Number: 4,543,380
[45] Date of Patent: Sep. 24, 1985

[54] PIGMENT FORMULATION, A PROCESS FOR ITS PREPARATION, AND ITS USE

[75] Inventors: Manfred Schneider, Eppstein; Reinhold Deubel, Bad Soden am Taunus; Manfred Zimmermann, Offenbach am Main, all of Fed. Rep. of Germany

[73] Assignee: Hoechst Aktiengesellschaft, Fed. Rep. of Germany

[21] Appl. No.: 620,447

[22] Filed: Jun. 14, 1984

[30] Foreign Application Priority Data

Jun. 18, 1983 [DE] Fed. Rep. of Germany ....... 3321998

[51] Int. Cl.[4] ............................................. C08K 5/42
[52] U.S. Cl. ..................................... 524/159; 524/601
[58] Field of Search .................... 524/159; 106/288 Q, 106/308 F, 308 M

[56] References Cited

U.S. PATENT DOCUMENTS 4,032,357  6/1977  Rees et al. ..................... 106/308 M
4,469,516  9/1984  Schneider et al. .............. 106/308 F
4,469,519  9/1984  Iyengar ......................... 106/308 M Primary Examiner—Lewis T. Jacobs
Attorney, Agent, or Firm—Connolly and Hutz

[57] ABSTRACT

The invention relates to readily dispersible strong pigment formulations containing arylpararosanilinesulfonic acid pigments of the formula

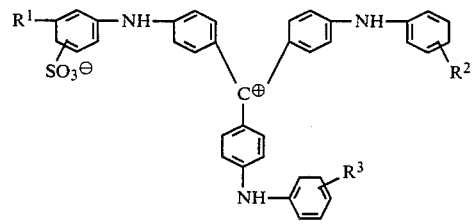

and a polyester resin which has been water-solubilized by neutralizing the carboxyl groups with nitrogen bases.

The pigment formulations are distinguished by being very readily dispersible in the various printing ink binders and by having a high tinctorial strength.

7 Claims, No Drawings

PIGMENT FORMULATION, A PROCESS FOR ITS PREPARATION, AND ITS USE

The present invention relates to readily dispersible strong pigment formulations containing arylpararosanilinesulfonic acid pigments of the general formula

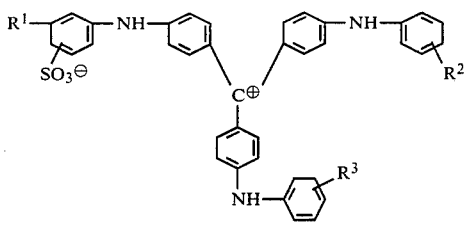

in which $R^1$, $R^2$ and $R^3$ each are hydrogen, chlorine, bromine or an alkyl or alkoxyl group of 1-3 carbon atoms in either case.

It is known that, on simply drying, aqueous press cakes of pigments from the arylpararosanilinesulfonic acid family, owing to their marked polar characteristics, form particularly hard agglomerates. In order to incorporate these pigments in the media which they are to color, for example printing inks, paints or plastics, these agglomerates need to be split up again, which requires a considerable amount of mechanical energy. If the disintegration of the agglomerates is not complete—an occurrence which is not rare these days because of the customary very short dispersing times—many and varied problems can arise in processing the pigments. Not only can prints turn out weak or specky, but, for example, the printing plate may suffer premature destruction. In order to bypass these problems, pigments of this group are frequently used in the form of a flushed paste in special varnishes. Not only is flushing a discontinuous process and hence very expensive in terms of hardware, but also flushed pastes are frequently obtained with only a relatively low pigment content (usually between 35 and 45% by weight). In addition, the high binder content of the flushed pastes presents problems in the formulation of certain printing ink recipes. Moreover, flushed pastes and their possible uses are strictly limited by whichever varnish was used in making up the paste, since the process of preparing the paste is affected by the hydrophilicity, the flushing tendency, the degree of pigment-wetting and other properties of the varnish. It is consequently very difficult to optimize in respect of the intended purpose. For instance, the pigments flushed in oxidatively drying varnishes cannot be used for producing carbon papers or typewriter ribbons. The emptying of containers holding flushed pastes is an additional problem, to the processor, since the highly viscous and viscoelastic pastes require considerable mechanical input for their removal, and losses are inevitable.

There are existing powder formulations of arylpararosanilinesulfonic acid pigments with natural resins or modified natural resins (cf. German Pat. No. 1,769,912). They do not meet the present-day requirements of the printing ink industry in respect of dispersibility, tinctorial strength, processing properties and freedom for formulating printing ink recipes. In addition, these natural resins are supplied as solid, resinous chips or lumps which, although relatively readily soluble in organic solvents, are only soluble in aqueous alkaline media if heated for a long time and if their acid number is greater than about 80 mg of KOH/g. Further existing formulations are with synthetic resins (cf. German Pat. No. 2,914,299). These, owing to their not inconsiderable content of water-incompatible solvents as solubilizers, are the cause of odor nuisance at their place of use. Furthermore, surface-active substances need to be present as well, and impair the substantivity of the resins to the effect that a considerable proportion of the resin in the formulation does not become bonded to the pigment but, on isolation of the formulated pigment, passes with the mother liquor into the waste water. Moreover, the presence of the surface-active substance makes it difficult to filter the precipitated pigment formulation.

It has now been found that arylpararosanilinesulfonic acid pigments can be prepared in readily dispersible formulations, for example as very strong, soft-textured pigment powders, in the various binders customary in the printing ink industry, with a significantly wider range of possible applications, if the formulating agent used is a water-soluble polyester resin having a carboxyl/hydroxyl ratio of 1:2 to 1:25.

The formulation is prepared by dissolving the pigments of said formula in water by heating to 50° to 100° C., preferably 80° to 100° C., in the presence of alkalis, to prepare an aqueous alkaline pigment solution, and by adding a solution of the polyester resin in water, followed by a mineral acid to precipitate the formulated pigment at pH 2 to 5, preferably pH 2 to 3.5.

The aqueous alkaline pigment solution is best prepared with sodium hydroxide or potassium hydroxide.

As a result of dispensing with organic solvents entirely, or keeping the content thereof very low (far below the level hitherto required for solubilization in the case of water-soluble resins) the odor nuisance during the formulation of the pigment and the pollution of the environment are reduced to a very considerable extent.

The types of resin which are to be used according to the invention were hitherto only used combined with water-compatible melamine resins for preparing rigid and resilient baking finishes and were in fact developed for that specific purpose.

The preparation of these polyesters is described in Austrian Pat. No. 328,587. They are formed by mixing or partially condensing a water-insoluble film-forming polyhydroxyl compound (PH) having an acid number below 10 mg of KOH/g and a hydroxyl number of 50 to 650 mg of KOH/g, and a film-forming polycarboxyl compound (PC) having an acid number of 30 to 280 mg of KOH/g, in a molar ratio of carboxyl groups to hydroxyl groups of 1:2 to 1:25, preferably 1:3 to 1:10, and by partially or completely neutralizing the carboxyl groups with nitrogen bases.

Suitable film-forming polyhyroxyl compounds (PH) are characterized not only by having hydroxyl groups but also by having virtually no carboxyl groups, in fact having so few that their acid number is below 10 mg of KOH/g. Their hydroxyl number is between 50 and 650 mg of KOH/g.

They are very readily prepared in conventional manner by condensing excess polyols, such as monoethylene glycol, diethylene glycol, triethylene glycol, glycerol, trimethylolpropane, or pentaerythritol, with polycarboxylic acids or their anhydrides, such as phthalic acid, terephthalic acid, trimellitic acid, succinic acid, adipinic acid, sebacic acid and the like, in the absence or involved presence of monocarboxylic acids having 5 to 20 carbon atoms. Another synthesizing method comprises reacting excess polyol with diisocyanates, for example toluylene diisocyanate or hexamethylene diisocyanate.

Likewise suitable PH are obtained by copolymerizing α,β-ethylenically unsaturated compounds having free hydroxyl groups, such as ethylene glycol monomethacrylic acid esters, with other copolymerizable vinyl compounds, such as esters of acrylic and/or methacrylic acid of monohydric alcohols, amides of acrylic and/or methacrylic acid, styrene, vinyltoluolene, and other monomers, provided they are free of carboxyl groups. The copolymers may also contain, as part of the polymer backbone, small amounts of formaldehyde condensates of melamine, urea, benzoguanamine, phenols and the like.

The film-forming polycarboxyl compound (PC) can be regarded as a macromolecular emulsifier which, when the surface coating has dried, is an integral component of the film structure. Suitable PCs having acid numbers of 30 to 280 mg of KOH/g can be obtained by reacting high-hydroxyl precondensates with dicarboxylic or tricarboxylic anhydrides, for example by reacting high-hydroxyl polyesters or polyurethanes with phthalic anhydrides or trimellitic anhydride. A preferred PC can be obtained by addition of dienophile compounds, for example maleic anhydride, onto unsaturated compounds having molecular weights of above 500. These include the esters of natural unsaturated fatty acids and resin acids with polyalcohols, for example glycerol or pentaerythritol, or with epoxy-bearing compounds, such as bisphenol A glycidyl ethers. Another suitable group of unsaturated compounds which can likewise take part in addition reactions consists of polymers of dienes (butadiene or isoprene). In all such addition products the anhydride group is split open, either with water or monohydric alcohols, before use as PC. Moreover, the PC can also be a copolymer of acrylic acid or methacrylic acid with other α,β-ethylenic and unsaturated monomers, such as (meth)acrylic acid esters, styrene or vinyltoluolene, or even a self-crosslinking copolymer of the type described in Austrian Pat. Nos. 291,571 and 299,543.

The carboxyl groups of the PCs are at least partially neutralized with nitrogen bases, such as ammonia, aliphatic amines or aliphatic alkanolamines. For example, diethylamine, triethylamine, N,N'-dimethylethanolamine, diethanolamine and the like are suitable.

PH and PC can be combined in the correct carboxyl/hydroxyl ratio of 1:2 to 1:25 by simply mixing them; in isolated cases, the two components may be partially condensed at a temperature between 80° and 140° C. This procedure is advisable when the compatibility (homogeneity of the combination product) of the two components is to be increased. The extent of the condensation reaction must not be raised to such a level that the solubility in water is lost as a result. In most cases it is sufficient to reduce the acid number in the condensation product by 8 to 15 points compared with the starting mixture.

It is preferable to use oil-free polyglycol-modified polyesters having a carboxyl/hydroxyl ratio of 1:2 to 1:25, preferably 1:3 to 1:10. These products are commercially available.

The polyester resins to be used according to the invention are supplied in the form of a 35–85% strength solution in water. Depending on the viscosity this solution can be further diluted with water, so that accurate metering is ensured for the formulation of pigment, which makes possible problemfree processing on a continuous basis. It is possible, for example, to meter the aqueous polyester solution into the continuous product stream by means of a metering pump.

Depending on the pigment and the intended use of the formulation, the polyester resin level is 1 to 25% by weight, preferably 2 to 15% by weight, based on the weight of the dry starting pigment. Drying the moist, compressed pigment formulation gives a soft-textured product which gives problemfree milling and is non-tacky.

In the course of the formulation according to the invention, the polyester resins, virtually without exception, are absorbed onto the pigment being formulated, and, for example, after drying at about 80° C., the prepared pigment formulation is readily dispersible in the various printing ink binders customary in the field.

The pigment formulations are therefore particularly suitable for use in printing inks, carbon copy and manifold papers, and typewriter ribbons.

The pigment formulations according to the invention can be dispersed remarkably easily using the dispersing equipment customary in the printing ink industry. The printing inks prepared therefrom have satisfactory printing properties. They are readily dispersible in the organically formulated dry offset printing varnishes and are non-piling and non-scumming; they are fully compatible, with a long shelf-life and no flocking tendency, even in the customary aqueous maleate and acrylate binders of aqueous flexographic printing and produce strong, shiny prints having excellent brightening properties. The pulverulent formulations according to the invention have about twice the tinctorial strength of the flushed pastes, so that they leave more freedom to add property-improving additives when formulating printing ink. The powder formulations, by virtue of the low resin content and the consequent small effect on viscosity in the formulating printing inks, have more possible applications.

The formulations according to the invention have an unlimited shelf-life, while flushed pastes tend to thicken, mainly as a result of the temperature being too high, and therefore have only a limited shelf-life. They are more accurately metered, can be removed from the transport containers without losses, and can be, for example, pneumatically transported from a stock reservoir bunker to the processing apparatus and automatically metered between the two.

If the pigment formulations according to the invention are to be used for preparing special flushed pastes, the flow behaviour and the smoothness of the finished pastes can be affected within wide limits by means of the resin content.

The suitability of the formulated press cakes for flushing is markedly increased and can be adapted, by means of the chosen resin level, to the flushing agents used. The elimination of water is more complete, and as a result the subsequent drying phase can be shortened.

The following examples illustrate the invention in more detail.

EXAMPLE 1

408 parts by weight of a water-moist press cake containing 24.5% by weight of the triphenyl-pararosanilinemonosulfonic acid of the formula

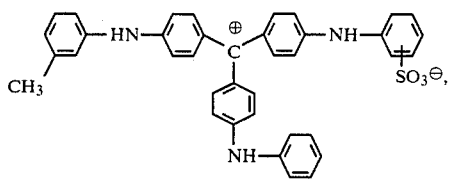

were slurried by adding 2,000 parts by weight of water and stirring. After addition of 19.5 parts by weight of sodium hydroxide the mixture was heated to 90°–100° C., and all the pigment dissolved.

16 Parts by weight of a neutralized polyglycol-modified oil-free polyester having a carboxyl/hydroxyl ratio of 1:3.8 and an acid number of about 45 mg of KOH/g before neutralization with a nitrogen base were added to the hot pigment solution. The mixture was stirred for 10 minutes, and the formulated pigment was then precipitated by adding 165 parts by weight of sulfuric acid. The pigment formulation was filtered off with suction, washed until saltfree, and dried at 70°–80° C. in a circulating air cabinet for 24 hours. The mother liquor had a oH-value of 2.3 and had a pinkish color. The yield was 111.5 parts by weight of an 89.7% by weight strength blue pigment formulation. The pigment formulation was milled and could be very readily incorporated, with litle dispersing, into strong printing inks in both a dry offset varnish and a flexographic varnish.

EXAMPLE 2

Example 1 was repeated, except that the moist press cake was isolated after having been washed saltfree. The yield was 619 parts by weight of water-moist pigment formulation. This water-moist press cake was liquefiable into a very free-flowing suspension by adding a mere 3 g of a dinaphthalenemethanesulfonate and stirring, and was dryable into a free-flowing powder by means of a spray-dryer at an inlet temperature of 220°–230° C. and an outlet temperature of 90°–95° C.. The powder was very readily processible, with little dispersing, into strong non-specky printing inks.

EXAMPLE 3

408 parts by weight of a moist press cake containing 24.5% by weight of the triphenylpararosanilinemonosulfonic acid of the formula

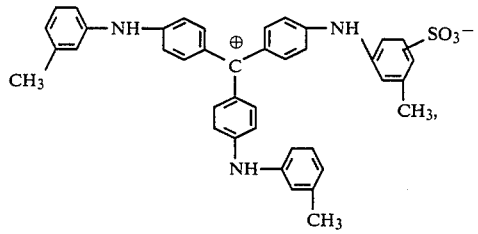

were slurried by adding 1900 parts by weight of water and stirring. After addition of 21 parts by weight of sodium hydroxide the mixture was heated to 90°–100° C., and all the pigment dissolved. 45 g of a 40% by weight strength aqueous soltution of a fatty-acid-modified water-soluble polyester resin having a carboxyl/-hydroxyl ratio of 1:2.4, an oil length of about 47% by weight, and an acid number of 50 mg of KOH/g before neutralization with a nitrogen base were added to the hot pigment solution. The mixture was stirred for 10 minutes, and the formulated pigment was then precipitated by adding 170 parts by weight of a 17% sulfuric acid. The formulation was filtered off with suction, washed until saltfree, and dried at 70°–80° C. in a circulating air cabinet for 24 hours.

The yield was 117 parts by weight of an 85.4% by weight strength blue pigment powder having a green shade and being very readily processible into strong non-specky printing inks.

EXAMPLE 4

408 parts by weight of a moist press cake containing 24.5% by weight of the triphenylpararosanilinemonosulfonic acid of the formula

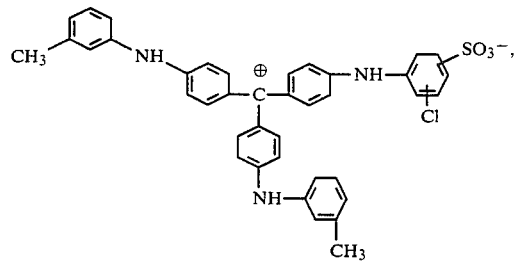

were slurried by adding 2000 parts by weight of water and stirring. After addition of 20 parts by weight of sodium hydroxide the mixture was heated to 90°–100° C., and all of the pigment dissolved. 4 Parts by weight of the polyester described in Example 1 were added to the hot pigment solution, which was stirred for 10 minutes, and the formulated pigment was precipitated by adding 170 parts by weight of a 17% sulfuric acid. Filtration produced 630 parts by weight of moist formulated pigment press cake. This press cake was easily flushed a little at a time with 130 parts by weight of a linseed oil flushed paste. The degree of water elimination was 92% by weight. Removal of the residual amount of water in vacuo produced an approximately 45% by weight strength flushed paste having good flow properties and tinctorial strength and being very finely divided.

We claim:
1. A pigment formulation containing
   (a) an arylpararosanilinesulfonic acid pigment of the formula

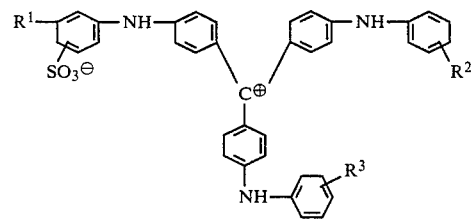

in which $R^1$, $R^2$ and $R^3$ each are hydrogen, chlorine, bromine or an alkyl or an alkoxy group of 1–3 carbon atoms in either case, coated by
   (b) a water-soluble polyester resin which has been prepared by mixing or partially condensing a water-insoluble film-forming polyhydroxyl compound having an acid number of less than 10 mg of KOH/g and a hydroxyl number of 50 to 650 mg of KOH/g and a filmforming polycarboxyl compound having an acid number of 30 to 280 mg of KOH/g in a molar ratio of carboxyl groups to hydroxyl groups of 1:2 to 1:25, and partially or completely neutralizing the carboxyl groups with nitrogen bases.

2. A pigment formulation as claimed in claim 1, wherein the polyester resin used is free of saturated or unsaturated fatty acids.

3. A pigment formulation according to claim 1 which contains 99 to 75 parts by weight of pigment and 25 to 1 part by weight of resin.

4. A process for preparing a pigment formulation as claimed in claim 1, which comprises dissolving the pigment in an alkaline aqueous medium, adding the water-soluble polyester resin, and precipitating the pigment formulation by adding a mineral acid.

5. The process for preparing a pigment formulation as claimed in claim 4, wherein the pigment formulation is precipitated from the alkaline solution at pH 2 to 5.

6. A process for pigmenting articles, which comprises incorporating into or coating said article with a composition as claimed in claim 1.

7. A process as claimed in claim 6, wherein said article is a printing ink, a manifold paper, carbon copy or a typewriter ribbon.

* * * * *